United States Patent
Delp et al.

[11] 4,277,658
[45] Jul. 7, 1981

[54] STEERING COLUMN SWITCH ASSEMBLY

[75] Inventors: Hermann Delp, Nauheim; Norbert Muller, Bischofsheim, both of Fed. Rep. of Germany

[73] Assignee: General Motors Corporation, Detroit, Mich.

[21] Appl. No.: 14,320

[22] Filed: Feb. 23, 1979

[30] Foreign Application Priority Data

Mar. 13, 1978 [DE] Fed. Rep. of Germany ....... 2810790

[51] Int. Cl.³ .............................................. H01H 9/02
[52] U.S. Cl. ................................. 200/61.54; 200/295; 248/27.1
[58] Field of Search .......................... 200/61.27–61.38, 200/61.54, 307, 293, 294, 295, 296; 180/78; 248/27.1; 280/779; 74/492, 494

[56] References Cited

U.S. PATENT DOCUMENTS

| | | | |
|---|---|---|---|
| 3,571,548 | 3/1971 | Osika | 200/295 |
| 4,016,380 | 4/1977 | Schawinsky et al. | 200/61.27 |
| 4,139,755 | 2/1979 | Hastings et al. | 248/27.1 |

OTHER PUBLICATIONS

German Utility Model, Gebrauchmuster No. 7201631, Apr. 13, 1972.
German Printed Application, Auslegeschrift, No. 2404280, Jan. 2, 1976.

Primary Examiner—J. V. Truhe
Assistant Examiner—Morris Ginsburg
Attorney, Agent, or Firm—Warren D. Hill

[57] ABSTRACT

A steering column switch assembly includes a carrier housing mounted on a steering column adjacent a steering wheel thereon. A plurality of switches, each in a housing, is detachably mounted in the carrier housing between a respective one of a plurality of pairs of parallel carrier faces on the carrier housing and extending parallel to the axis of the steering column. Resilient means on each switch housing engage stop surfaces on the respective pair of carrier surfaces to retain said switch housing in said carrier housing.

4 Claims, 6 Drawing Figures

STEERING COLUMN SWITCH ASSEMBLY

The invention relates to a steering column switch assembly for motor vehicles which is arranged at the end of a casing tube accommodating the steering shaft and is connected to same, and in which switch elements carrying out different switching functions are arranged.

It is known to provide such a switch assembly wherein individual switch elements or switching devices are firmly secured to an approximately circular base plate, together with which they form a switch housing. This switch housing is provided with an approximately centrally arranged tubular extension by means of which it is pushed into the casing tube, where it is connected in some suitable manner, for example by means of radially arranged screws. Operation of the switch elements is effected through one single actuating member, namely a switch lever which, through lever connections and slider connections, and also by rotation of the lever about its axis as well as by movements in peripheral direction and in a direction along the casing tube, actuates the switch elements for a windscreen wiping and washing device, flasher system, the main light beam or by-pass light signal. Two and even more switch levers could alternatively be provided for carrying out these switching functions. Each switch element is connected to electric leads which pass to the respective devices.

A disadvantage of this known switch is that, in the event of a fault in one of the switch elements, the entire switch housing has to be dismantled and replacements have to be made, which is very uneconomical. Moreover, dismantling is very expensive because, for this purpose the steering wheel has to be removed and the electrical lead connections to all the switch elements have to be released.

An object of the present invention is to provide a steering column switch in which, in the event of a fault in one of the switch elements, the entire switch housing does not have to be dismantled and in which the defect can be overcome without having to remove the steering wheel.

According to the invention, this can be achieved by arranging that each of the switch elements carrying out one or more switching functions, is a switch on its own account consisting of a housing with electrical connections and an actuating member, whilst a carrier housing connected to the steering column casing tube has faces which extend axially outside the casing tube and run parallel therewith, and on which the switch is secured in an easily releasable manner whereby, if a switch element becomes defective, this element itself alone can be replaced economically with minimum loss of material, and in such a way that the steering wheel does not have to be taken off. The carrier housing, preferably formed from a plastics material which has faces running parallel with the casing tube, ensures that changing of the switches can take place without dismounting the steering wheel simply by moving the switch in radial direction towards the carrier housing and securing it thereto.

Attachment of the carrier housing to the steering column casing can readily be attained by providing means for a snap-fit connection on the faces of the carrier housing and on the switch assembly. This snap-fit connection may be so designed that no tool is necessary either for assembling or dismantling a switch.

It is important that each switch should be firmly secured to the carrier housing, because the attachment or mounting must be capable of withstanding forces acting on the actuating member, for example at a switch lever during the switching operation, therefore for each switch, according to a further feature of the invention, paired mutually parallel faces running approximately in tangential direction to the casing tube are provided on the carrier housing, each pair of faces accommodating a switch between them and having projections, whilst the lateral faces of the switch are provided with flexible resilient attachments for a snap-fit gripping engagement behind the projections.

A particularly effective mounting of a switch between paired faces formed by the carrier housing (i.e. an excellent support of the switch against the housing) is attained if the faces on the carrier housing and the lateral faces on the switch are provided with resilient guide means formed by a groove and tongue. The result is that the switch is also secured in its position with reference to the longitudinal direction of the casing tube, whilst the introduction of the switch between the two faces of the carrier housing is simplified.

Appropriately, the guide means extend in tangential direction approximately over the length of the switch whilst they protrude beyond the tangentially shorter faces of the carrier housing. This ensures optimum guiding and support for the switch.

Advantageously, the flexible attachments at the lateral faces of a switch are formed by resilient arms lying parallel with the lateral faces. In order to facilitate an easy release of the snap-fit connection, the resilient arms are connected to the side of the switch near the end thereof adjacent the casing tube and, in their snap-fit engaged condition, their free ends each project in tangential direction beyond the faces. Since the faces serving for the snap-fit engaging action are tangentially shorter than the guide means—and therefore shorter than the switch—the ends of the arms do not protrude beyond the switch and do not lie in the way of the casing tube covering.

Embodiments of the invention by way of example are explained in detail below, with reference to the accompanying drawing in which.

Figure 1:
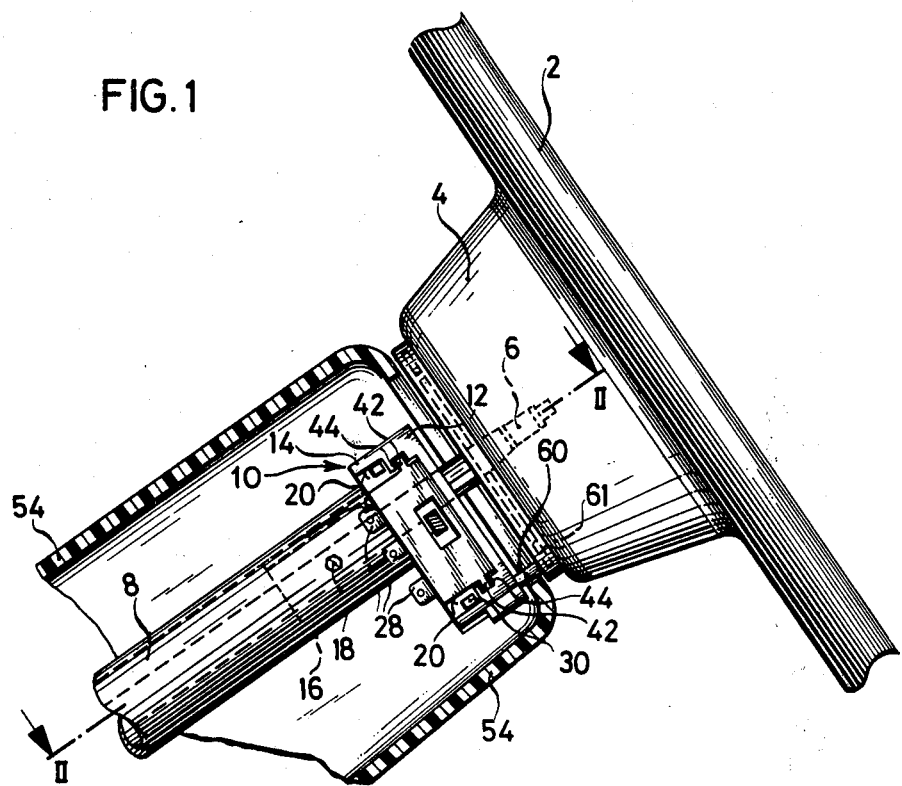
FIG. 1 is a side elevation of a steering column casing tube with a switch assembly according to the invention, and also showing the steering wheel.

A steering wheel 2 with its hub 4, is connected rotationally-fast with the steering shaft 6, in a manner known per se. In the interests of simplicity, the presentation of details in this connection is omitted. The steering shaft 6 is enclosed by the casing tube 8 which is secured in a well known (and therefore not illustrated) manner to the dashboard and bulkhead. A steering column switch assembly 10 is located at the upper end of the casing tube 8.

This switch assembly 10 includes a carrier housing 12 which has a part 14 protruding in axial direction beyond the casing tube 8, as well as a tubular extension 16 which is connected to the part 14 and is inserted into the casing tube 8 and secured by means of one or more screws 18, as shown, or in other suitable manner.

Figure 5:
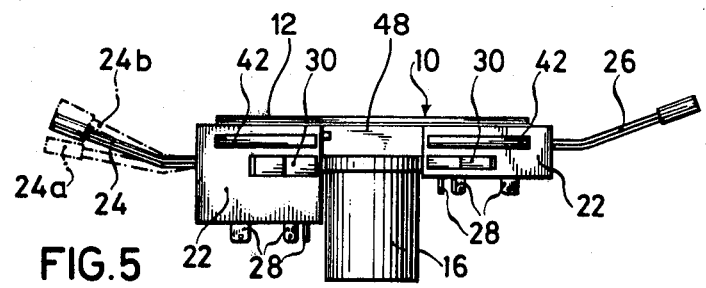
FIG. 5 is a schematic view of a steering column switch assembly according to the invention showing switch positions of an actuating member.
Figure 6:
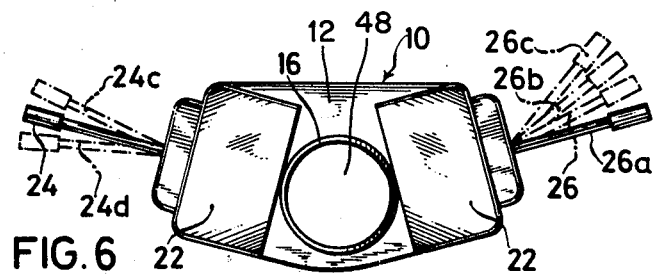
FIG. 6 is a plan view of the assembly of FIG. 5 also indicating the switch positions of the actuating member.
Figure 3:
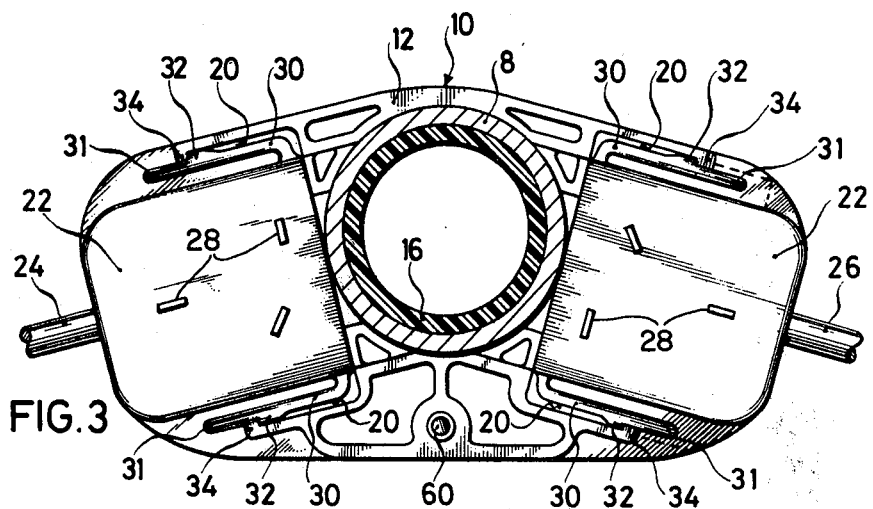
FIG. 3 is a section along line III—III of FIG. 2 showing two separate switches.
Figure 4:
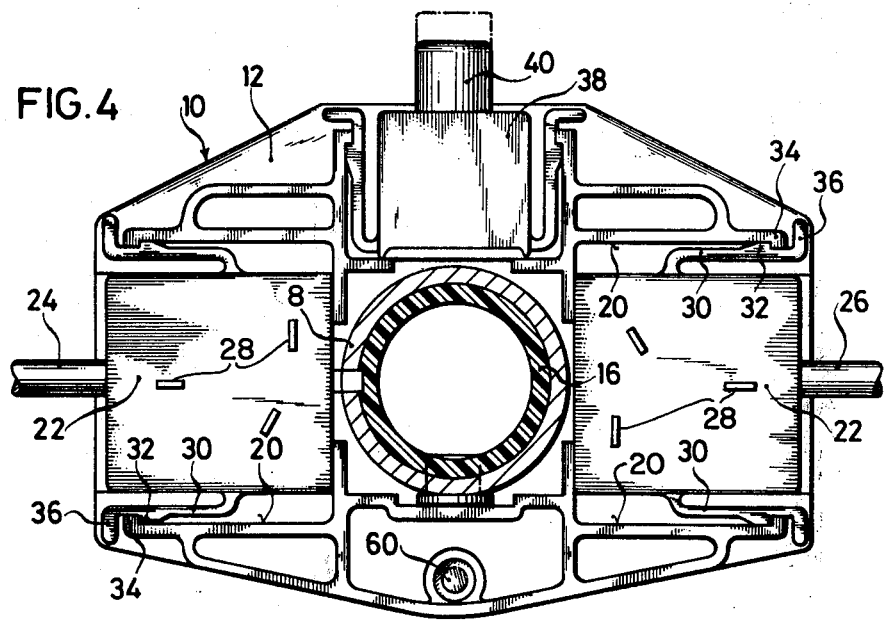
FIG. 4 is a view of an alternative device to that of FIG. 3 but with three separate switches.

The part 14 of the carrier housing 12 is provided with paired opposed faces 20 running parallel with the casing tube, as will be seen from FIGS. 1, 3 and 4. A switch 22 is mounted between each pair of opposed faces. FIGS. 5 and 6 show how, with the actuating member 24 of the left-hand switch 22 designed as a shift lever and moving in the direction of the longitudinal axis of the casing tube, the main beam and the by-pass light signal are operated through positions 24a and 24b. The mid-position indicated by numeral 24 denotes the dimming light.

In FIG. 6, position 24c signifies flashing, right, and position 24d signifies flashing, left. The actuating member 26 of the right-hand switch 22 for the windscreen wiping and washing device in FIG. 6 may be brought from the starting position into position 26a for intermittent switching as well as into the positions 26b and 26c by which the windscreen wiper motor, conveniently a two-speed motor, is switched on at one or other of its speeds. If need be, the switches 22 may perform additional functions, or again for the purpose of dividing certain switching functions, these functions may be distributed over two separate switches.

As shown, each switch 22 constitutes a separate component with an actuating member 24 or 26 and electrical connections 28. The outgoing lines with their connection means, are not illustrated. As will best be seen from FIGS. 3 and 4, each switch 22 is provided laterally with resilient arms 30 which, at the side of the switch 22 facing the casing tube 8, are in communication with same. The arms 30 are provided with attachments 32 which, in the snap-fit engaged condition, lie behind projections 34 on the faces 20 as each switch 22 is pushed in radially between a pair of the faces 20. The projections 34 are located at the outer end of the faces 20 which, seen radially, are shorter than the arms 30. The ends 31 of the arms 30 protrude radially over the faces 20, and it is possible, by compressing these ends together, i.e. by pressing these ends 31 against the switch 22, to release the snap-fit connection and to remove this switch 22 from the carrier housing 12, in radial direction.

In FIG. 4, the arms 30 are connected to the switch 22 more towards the middle of this latter. The outer ends of the arms 30 are provided with bent-over portions 36 which also serve to facilitate easy release of the snap-fit connection. Establishment of this snap-fit connection is achieved automatically, by pushing the switch 22 in between the faces 20. In FIG. 4, in addition to the two switches 22, a third switch 38 with an actuating member 40 in the form of a press-button, is provided. The switch 38 which is secured to the carrier housing 12 in the same manner as the switches 22, serves for switching on the warning flasher system.

Figure 2:
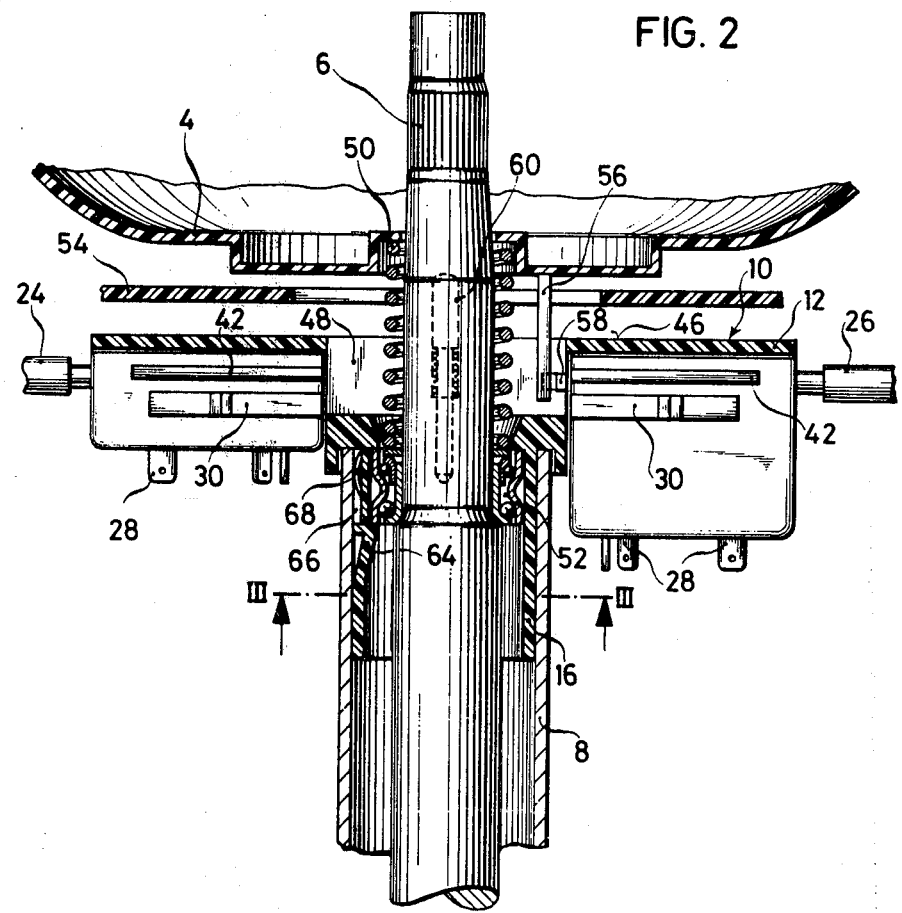
FIG. 2 is a section along line II—II of FIG. 1 to a larger scale.

Parallel with the arms 30, each switch 22 or 38 has one projection 42 at each side (FIGS. 1 and 2). It takes the shape of a resilient tongue and is guided in a groove 44 formed on the adjacent face 20 of the carrier housing 12. As will be seen from FIG. 2, the tongue 42 extends over almost the entire length of switch 22. The groove 44 in the carrier housing 12 is the same length also. This results in excellent guiding and retaining of the switch 22 between the paired faces 20.

Adjacent the steering wheel hub 4, the carrier housing 12 is provided with a flat face 46 (FIG. 2) having a circular aperture 48 therein for passage of the steering shaft 6 and a spring 50 which is arranged between the steering wheel 2, and a roller bearing 52, for steering shaft 6. The casing tube 8 and the steering column switch assembly 10 are enclosed by a two-part covering 54 which also extends between the face 46 of the switch assembly 10 and the steering wheel hub 4. The covering 54 is provided with apertures (not shown) providing passages for the actuating members 24, 26 and 40, and it is easily removable.

A pin 56 secured to the steering hub 4 extends through the aperture in face 46. This pin co-operates with an attachment 58 on the switch 22 for the flasher system, for the purpose of returning the flasher switch. A horn contact pin 60 extends through the part 14 of the carrier housing 12 and is downwardly movable against a spring bias. Displacement of a metallic ring 61 provided in the steering wheel hub 4, into contact with pin 60, closes the circuit for the horn. The horn contact pin 60 is directly connected with a lead (not shown).

The use of plastics material for the carrier housing 12 necessitates an earth connection between the steering shaft 6 and the casing tube 8. To this end the roller bearing 52 for the steering shaft 6 is held in the tubular extension 16 by means of inwardly projecting resilient attachments 64 (FIG. 2). In the tubular extension 16 there is a cavity 66 housing a resilient element 68 which establishes a conducting connection between the roller bearing 52 and the casing tube 8, and therefore between the steering shaft 6 and the latter for, during insertion of the carrier housing 12 in the casing tube 8, the element 68 as it were, scores a path for itself into the surface of the casing tube 8. More than one such element 68 may be provided as desired.

We claim:

1. In a motor vehicle having a steering column comprising a casing tube surrounding a steering shaft carrying a steering wheel, a steering column switch assembly mounted at the end of the casing tube adjacent the steering wheel, comprising: a plurality of switches having different switching functions, each switch having a housing, electrical connections and an actuating member independent of the other switches, a carrier housing secured to the said end of the casing tube for supporting the switches and having for each switch outside the casing tube and extending parallel to the axis of the steering column a pair of parallel carrier faces disposed approximately tangentially to the casing tube for slidably receiving a switch therebetween, and means for releasably securing the switches to the carrier housing comprising stop portions on at least one face of each pair of carrier faces and the respective switch housings carrying resilient arms for latchingly engaging corresponding stop portions.

2. In a motor vehicle having a steering column comprising a casing tube surrounding a steering shaft carrying a steering wheel, a steering column switch assembly mounted at the end of the casing tube adjacent the steering wheel, comprising: a plurality of switches having different switching functions, each switch having a housing, electrical connections and an actuating member independent of the other switches, a carrier housing secured to the said end of the casing tube for supporting the switches and having for each switch outside the casing tube and extending parallel to the axis of the steering column a pair of parallel carrier faces disposed approximately tangentially to the casing tube for slidably receiving a switch therebetween, and means for releasably securing the switches to the carrier housing comprising stop portions on at least one face of each pair of carrier faces and the respective switch housings carrying resilient arms for latchingly engaging corresponding stop portions, the resilient arms each being attached to the respective switch housing at a side thereof and extending generally parallel to the adjacent carrier face with a free end of the arm extending away from the steering column and projecting beyond the adjacent carrier face to thereby allow manipulation of the arms to effect easy switch removal.

3. In a motor vehicle having a steering column comprising a casing tube surrounding a steering shaft carrying a steering wheel, a steering column switch assembly mounted at the end of the casing tube adjacent the steering wheel, comprising: a plurality of switches having different switching functions, each switch having a housing, electrical connections and an actuating member independent of the other switches, a carrier housing secured to the said end of the casing tube for supporting the switches and having for each switch outside the casing tube and extending parallel to the axis of the steering column a pair of parallel carrier faces disposed approximately tangentially to the casing tube for slidably receiving a switch therebetween, guide means comprising a tongue projecting from each side of the switch housings and extending in the tangential direction along the switch housing and a mating groove in the corresponding carrier face to slidably engage the tongue thereby guiding and retaining the switch housing between the faces, and means for releasably securing the switches to the carrier housing comprising stop portions on at least one face of each pair of carrier faces and the respective switch housings carrying resilient arms for latchingly engaging corresponding stop portions.

4. In a motor vehicle having a steering column comprising a steering shaft carrying a steering wheel and a casing tube surrounding the steering shaft and having an end spaced from the steering wheel, a steering column switch assembly mounted at the end of the casing tube adjacent the steering wheel, comprising, a plurality of switches having different switching functions, each switch having a housing, electrical connections and an actuating member independent of the other switches, a carrier housing for supporting the switches including a tubular extension fitting within the casing tube at the end thereof to thereby secure the carrier housing and having for each switch outside the steering column and extending parallel to the axis of the steering column a pair of parallel carrier faces disposed approximately tangentially to the steering column for slidably receiving a switch therebetween, guide means comprising a tongue projecting from each side of the switch housings and extending in the tangential direction along the switch housing and a mating groove in the corresponding carrier face to slidably engage the tongue thereby guiding and retaining the switch housing between the faces, and means for releasably securing the switches to the carrier housing comprising stop portions on at least one face of each pair of carrier faces and the respective switch housings carrying resilient arms for latchingly engaging corresponding stop portions, the resilient arms each being attached to the respective switch housing at a side thereof and extending generally parallel to the adjacent carrier face with a free end of the arm extending away from the steering column and projecting beyond the adjacent carrier face to thereby allow manipulation of the arms to effect easy switch removal.

* * * * *